United States Patent [19]

Stubbs et al.

[11] Patent Number: 5,402,225
[45] Date of Patent: Mar. 28, 1995

[54] OPTICAL INSTRUMENT EVALUATION USING MODULATION TRANSFER FUNCTION CHART

[75] Inventors: Jack B. Stubbs, Waynesville; John A. Cartmill, Cleveland Heights, both of Ohio

[73] Assignee: Ethicon, Inc., Cincinnati, Ohio

[21] Appl. No.: 157,617

[22] Filed: Nov. 24, 1993

[51] Int. Cl.$^6$ ............................................. G01M 11/00
[52] U.S. Cl. .................................. 356/124.5; 283/115
[58] Field of Search ............................. 356/124, 124.5; 351/239; 283/115

[56] References Cited

U.S. PATENT DOCUMENTS

| | | | |
|---|---|---|---|
| 4,324,459 | 4/1982 | Gerharz | 356/124.5 |
| 4,575,124 | 3/1986 | Morrison | 356/243 |
| 4,653,909 | 3/1987 | Kuperman | 356/124.5 |
| 5,303,023 | 4/1994 | Portney et al. | 356/124.5 |

FOREIGN PATENT DOCUMENTS

| | | | |
|---|---|---|---|
| 1097833 | 4/1989 | Japan | 356/124.5 |
| 1196529 | 8/1989 | Japan | 356/124.5 |

OTHER PUBLICATIONS

Armin J. Hill, "A Resolution Test Chart for Motion Picture Cameras", American Cinematographer, Oct. 1951, vol. 32, Iss. #10, p. 402.
"Resoluton Test Chart of the Motion Picture Research Council" British Kinematography, Oct. 1952, vol. 21, Iss. 4, pp. 102–103.
Whelan et al, "Videoarthroscopy: Review and State of the Art; *Arthroscopy*" *The Journal of Arthroscopic and Related Surgery*, 8(3):311–319, 1992.

*Primary Examiner*—Richard A. Rosenberger
*Assistant Examiner*—Jason D. Eisenberg
*Attorney, Agent, or Firm*—Killworth, Gottman, Hagan & Schaeff

[57] ABSTRACT

A novel chart permits rapid and inexpensive evaluation of an optical instrument for manufacturing purposes and/or by an operator of the instrument. For example, a user of an optical instrument may directly test the performance of an instrument without the assistance of trained personnel or a well-equipped laboratory facility. The chart comprises a plurality of levels defined by blocks having converging lines extending therein. The plurality of levels define a corresponding plurality of contrast levels between their blocks and the converging lines therein. The chart is used by viewing a plurality of levels within the chart and determining corresponding line frequency values at which the viewer is unable to discern multiple lines. These line frequency values are then compared to calibration line frequency values for the instrument being evaluated. The chart of the present invention is easily transported and used, and may be supplied along with an optical instrument to define operating characteristics of the instrument.

21 Claims, 3 Drawing Sheets

OPTICAL INSTRUMENT EVALUATION USING MODULATION TRANSFER FUNCTION CHART

BACKGROUND OF THE INVENTION

The present invention relates, in general, to evaluating the operation of imaging equipment and, more particularly, to charts and methods for evaluating the image quality of such equipment by approximating a modulation transfer function. While the present invention is generally applicable to a variety of imaging equipment it will be described with reference to an optical instrument, such as a laparoscope, for which it is particularly applicable and is being initially applied.

The quality of optical/video/imaging systems is often characterized in terms of a modulation transfer function (MTF). A typical MTF measurement system uses a target defining a pattern having a series of alternating light and dark parallel lines, which are imaged by the system under test. A "line" is defined as consisting of one light bar and one dark bar, i.e., one light image cycle.

The target pattern has several series of parallel lines with each series of lines having different spacing, expressed as a line frequency or number of lines per millimeter. The series may range from a coarse line, for example 1 line per millimeter, to a fine line, for example 10 lines per millimeter.

To evaluate an optical instrument, the target pattern is imaged through the optical instrument and the amount of light passing through the instrument is detected as the instrument is scanned from the coarse end of the pattern toward its fine end. The amount of light detected varies as the scan progresses, and an image modulation is given by:

$$M_i = \frac{I_{max} - I_{min}}{I_{max} + I_{min}}$$

where $I_{max}$ and $I_{min}$ represent the maximum and minimum image illumination on the detector. The object modulation, $M_o$, is similarly derived from the maximum and minimum brightness levels of the object:

$$M_0 = \frac{T_{max} - T_{min}}{T_{max} + T_{min}}$$

The modulation transfer function is then defined as the ratio of the image modulation to the object modulation, $M_i : M_o$.

Unfortunately, the measurements required previously to derive a modulation transfer function are costly and timeconsuming. For example, the measurements must be performed in a laboratory having complicated equipment requiring skilled technicians for maintenance and operation of the equipment.

It is, thus, apparent, that there is a need for a simplified technique for quickly and inexpensively evaluating the image quality of an optical instrument. Preferably, such a technique would allow the operator of an optical instrument to directly evaluate the performance of an optical instrument at the time the instrument is to be used.

SUMMARY OF THE INVENTION

The present invention meets this need by means of a novel chart which permits rapid and inexpensive evaluation of an optical instrument or other imaging system. For example, a user of an optical instrument may directly test the performance of an instrument without the assistance of trained personnel or a wellequipped laboratory facility. The chart comprises a plurality of levels defined by blocks having converging lines extending therein. The plurality of levels define a corresponding plurality of contrast levels between their blocks and the converging lines therein. The present invention also encompasses methods of evaluating an optical instrument using the aformentioned chart by viewing a plurality of levels within the chart and determining corresponding line frequency values at which the viewer is unable to discern multiple lines. The determined line frequency values are then compared to calibration line frequency values for the instrument being evaluated. The chart of the present invention is easily transported and used, and may be supplied along with an optical instrument to define the operating characteristics of the instrument.

In accordance with one aspect of the present invention, a method of evaluating an optical instrument comprises the steps of: providing a chart comprising a plurality of blocks having the same color and varying color intensities, a plurality of sets of converging lines, each of the sets of converging lines being located within an associated one of the blocks and having a known contrast level in comparison to the associated block, the lines having substantially the same color as the blocks, and a measurement scale for indicating the line frequency along the converging lines; scanning the sets of converging lines with an optical instrument; and using the measurement scale to determine the line frequencies along the plurality of sets of converging lines at which a user of the optical instrument is unable to differentiate the converging lines.

For ease of use, the sets of converging lines are substantially aligned with one another and the measurement scale is substantially aligned therewith. The color of the sequence of blocks can be selected from the group consisting of red, green, and blue. By utilizing red, green, and blue charts, an optical instrument can be evaluated for full color imaging. In a working embodiment of the present invention, the converging lines range in frequency from 1 line pair per millimeter to 10 line pairs per millimeter; the contrast levels between the blocks and the converging lines range from 100% to 0%, and the color intensities of the blocks are measured in gray scale levels.

To evaluate an optical instrument, the method further comprises the step of comparing determined line frequencies at which the optical instrument becomes incapable of distinguishing the converging lines to corresponding acceptable line frequencies for a satisfactory optical instrument. The step of comparing determined line frequencies to acceptable line frequencies for a satisfactory optical instrument may comprise the steps of plotting determined line frequencies at which the optical instrument becomes incapable of distinguishing the converging lines to produce a curve representative of the operating characteristics of the optical instrument, and comparing the line frequency plot to a graph containing a range of acceptable line frequencies, to determine whether the optical instrument is performing satisfactorily.

In accordance with another aspect of the present invention, a method of evaluating an optical instrument comprises the steps of: viewing a plurality of sets of converging lines positioned on a corresponding plurality of blocks of like color, the plurality of sets of converging lines and the blocks defining a corresponding plurality of different contrast levels therebetween; scanning the plurality of sets of converging lines through an optical instrument; determining line frequencies along each of the plurality of sets of converging lines at which a user of the optical instrument is unable to differentiate the converging lines; and recording the line frequencies. For general evaluation of an optical instrument, the color is black. For color evaluation, three charts are utilized wherein the colors are selected from the group consisting of red, green and blue, or other colors appropriate for a given system.

In accordance with yet another aspect of the present invention, a chart for evaluating an optical instrument comprises a plurality of blocks having the same color but varying color intensities, and a plurality of sets of converging lines, each set of converging lines being located within an associated one of the blocks and having a known contrast level in comparison to the associated block, the lines having substantially the same color as the blocks. A measurement scale is provided along the sets of converging lines for indicating the line frequency therealong, which line frequency ranges from 1 to 10 line pairs per millimeter. To facilitate measuring line frequency, the plurality of sets of converging lines and the measurement scale are substantially aligned with one another. The contrast level between the blocks and the converging lines ranges from 100% to 0% and may be measured in gray scale levels. For full color evaluation, the color of the blocks is selected from the group consisting of red, green, and blue.

In accordance with still another aspect of the present invention, a chart for evaluating an optical instrument comprises a sequence of substantially aligned blocks of the same color, the color intensities of the blocks ranging from near-white to near-black, and a plurality of substantially aligned sets of converging lines with each of the sets of converging lines being located within an associated one of the blocks and having a known contrast level, ranging from 100% to 0%, in comparison with the associated block. The converging lines are substantially the same in color and color intensity as at least one of the blocks, and the converging lines range in frequency from 1 line pair per millimeter to 10 line pairs per millimeter. A measurement scale is substantially aligned with the plurality of converging lines for indicating the line frequencies along the converging lines. For full color evaluation, the color of the sequence of blocks is selected from the group consisting of red, green, and blue.

It is an object of the present invention to provide a chart which permits rapid and inexpensive evaluation of an optical instrument by a manufacturer or user of the instrument; to provide a method of evaluating an optical instrument by scanning the aforementioned chart to determine resolution line frequencies at different contrast levels within the chart; and, to provide a chart that is easily transported and may be supplied along with an optical instrument to define the instrument's operating characteristics.

Other objects and advantages of the invention will be apparent from the following description, the accompanying drawings and the appended claims.

DETAILED DESCRIPTION OF THE PRESENT INVENTION

Figure 1:
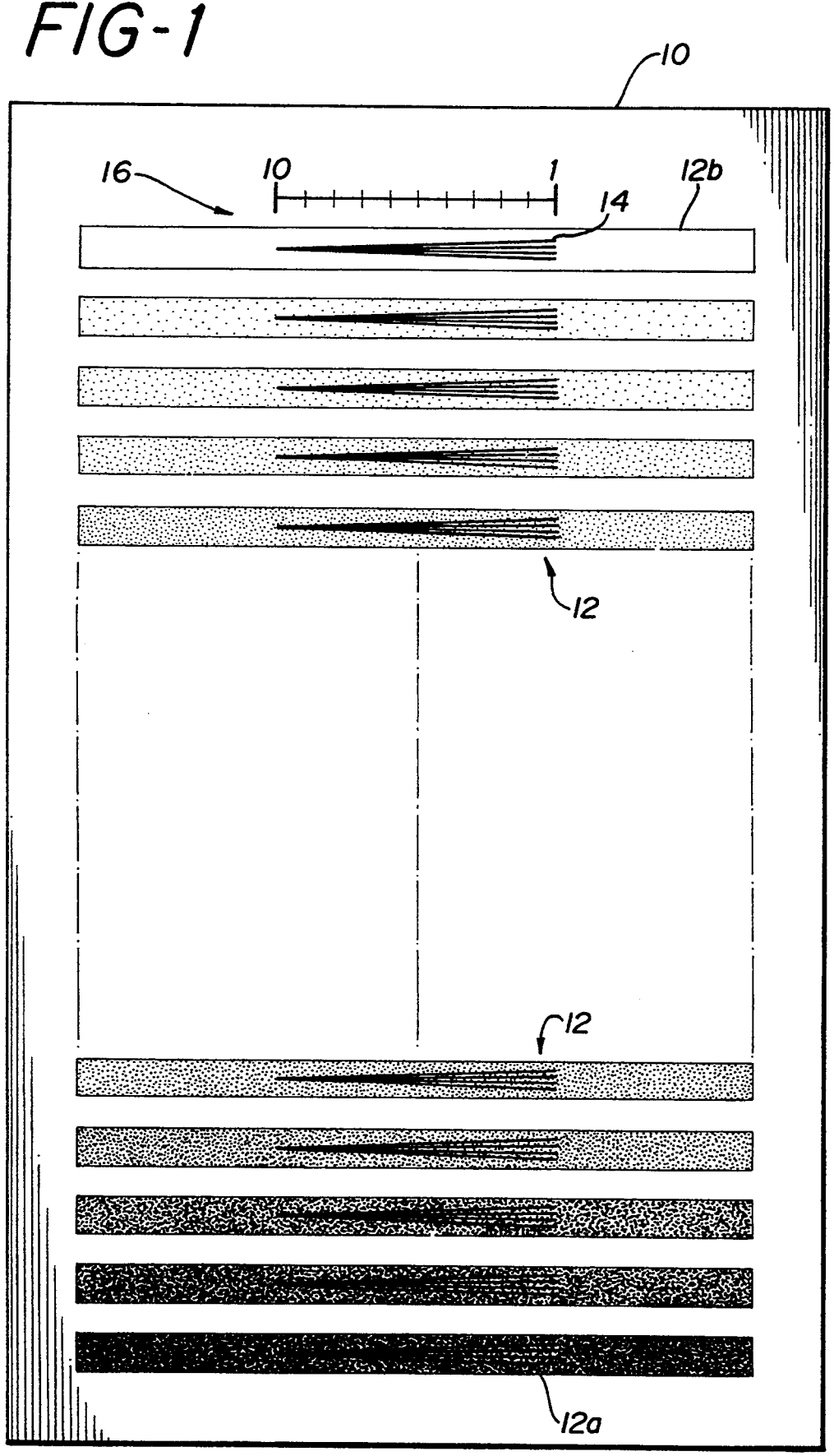
FIG. 1 is a chart in accordance with the present invention.

Charts and methods of the present invention for rapidly and inexpensively evaluating an optical instrument will now be described with reference to the drawings wherein FIG. 1 shows a chart 10 of the present invention. The chart 10 comprises a plurality of blocks 12 having the same or like color and varying color intensities. The chart 10 further comprises a plurality of sets of converging lines 14, each set of converging lines 14 being located within an associated one of the blocks 12 and having a known contrast level in comparison with its associated block 12. The lines 14 are of substantially the same color as the blocks 12.

A measurement scale 16 is provided along the sets of converging lines 14 for indicating the line frequency therealong. The line frequency ranges from 1 line pair per millimeter to 10 line pairs per millimeter. To facilitate measuring line frequency, the plurality of sets of converging lines 14 and the measurement scale 16 are substantially aligned with one another.

In the illustrated embodiment, the contrast level between the blocks 12 and the converging lines 14 ranges from 0% to 100% and may be measured in gray scale levels. A contrast level of 0% is represented by a block 12a at one end of the chart 10 wherein the block 12 and the converging lines 14 have maximum and substantially identical color intensities, i.e. black. A contrast level of 100% is represented at the other end of the chart 10 wherein the block 12b has substantially no color and the converging lines 14 have maximum color intensity.

In operation, however, it is not necessary for the entire range of contrast levels to be provided or if provided to be used for instrument evaluation. Rather, satisfactory instrument evaluation oftentimes is performed by using a plurality of levels within the chart 10. Thus, as described hereinafter, one may take readings at various levels along the chart and compare those readings to standard readings for instrument evaluation.

Further, while the drawings are in black and white, the terms black and white refer to color intensity with the actual color of the charts being defined by the evaluation to be performed. For example, for full color evaluation, the color of the chart 10, i.e. the blocks 12 and the converging lines 14, is selected from the group consisting of red, green, and blue. Thus, an evaluation at the three colors: red, green and blue, gives a full color evaluation of an optical instrument.

In the illustrated embodiment, the converging lines 14 are printed at a maximum or black color level relative to the blocks 112 which vary in gray scale levels from maximum intensity or black to minimum intensity or white. However, it should be apparent that both the blocks 12 and the converging lines may vary in color intensities as long as the contrasts between the blocks 12 and the converging lines 14 vary as one moves from level to level within the chart 10.

Figure 2:
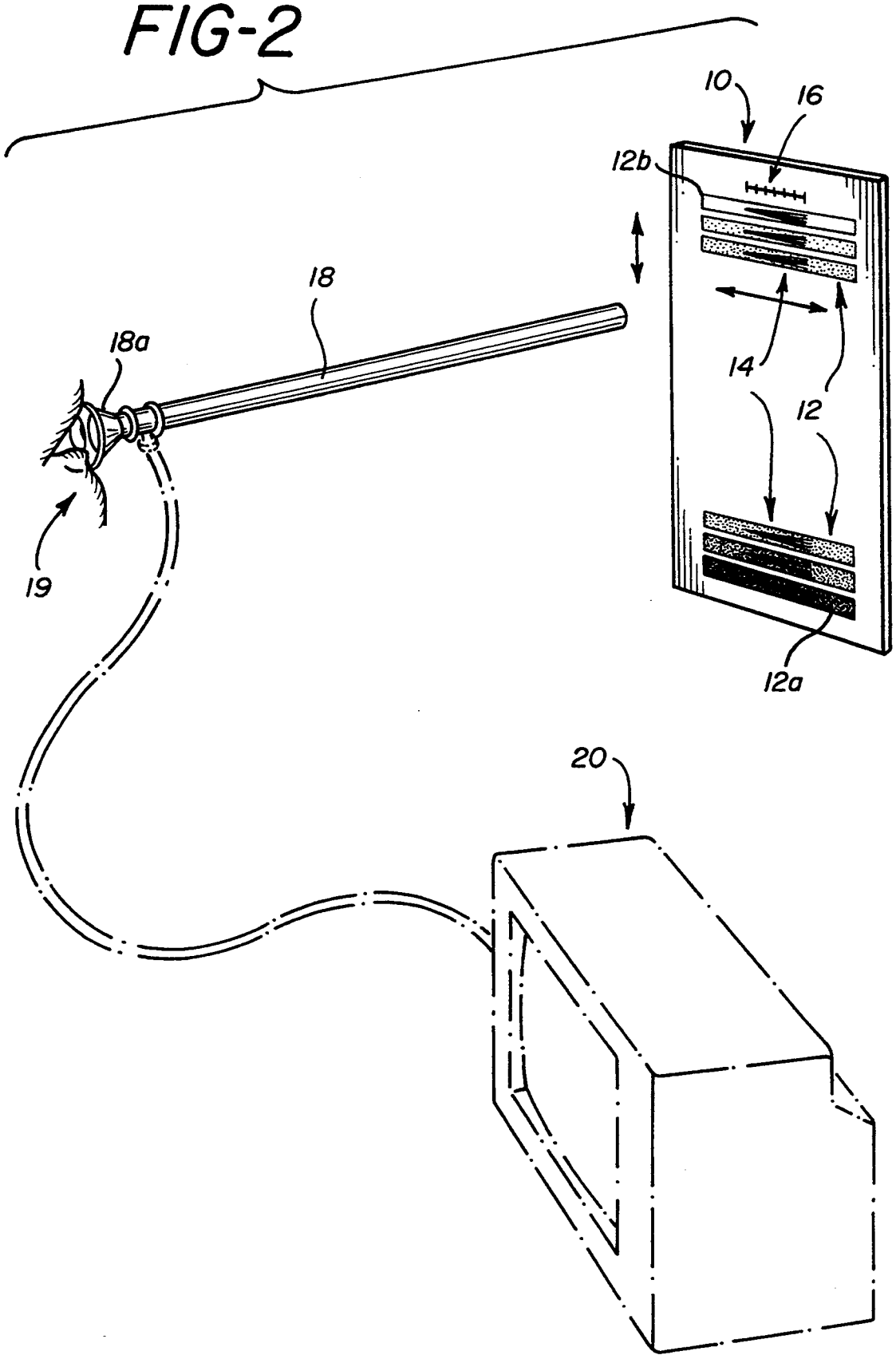
FIG. 2 shows use of the chart of FIG. 1 in accordance with the present invention for evaluation of an optical instrument.

Reference will now be made to FIG. 2 for describing a method of using the chart 10 of FIG. 1 to perform an evaluation of an optical instrument in accordance with the present invention. For evaluating an optical instrument 18, such as a laparoscope as illustrated, a chart 10 as described above is provided. An operator 19 views the chart 10 through the optical instrument 18 and scans one of the sets of converging lines 14 to determine the point along the converging lines at which the operator is unable to differentiate the converging lines 14. As shown in FIG. 2, the operator 19 views the image of the chart 10 through an eyepiece 18a; however, the operator 19 may also view the image of the chart 10 through a video monitor 20 in accordance with conventional laparoscopic technology.

In any event, the operator 19 then reads the line frequency from the measurement scale 16 and records the line frequency for comparison to a table or graph of acceptable line frequency values for the laparoscope 18. This procedure is repeated until a plurality of line frequency values have been recorded for evaluation of the laparoscope 18. Scanning is accomplished by moving the optical instrument 18 horizontally along a given set of converging lines 14 and vertically among various levels or blocks 12.

While all of the levels of the chart 10 can be imaged by the operator 19, it is quicker and more convenient to take a sampling within the central portion of the chart 10. the plurality of levels which are imaged by the operator 19 need not be adjacent to one another or taken in order as long as the corresponding contrast level is also recorded with the line frequency value.

Figure 3:
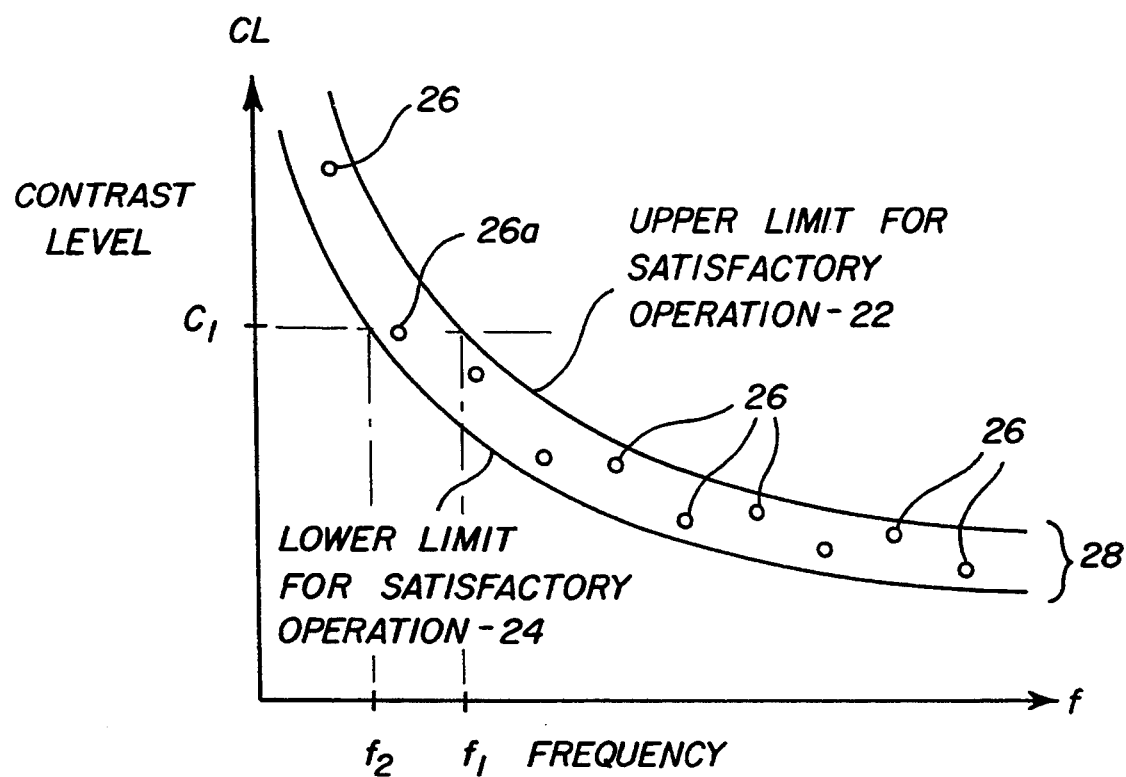
FIG. 3 is a plot of line frequencies at different contrast levels on the chart of FIG. 1 verifying acceptable operation of an optical instrument characterized by the limit lines shown in FIG. 3.

The optical instrument is then evaluated by comparing the line frequency values read from the chart 10, as described above, with corresponding acceptable line frequency values for a satisfactorily operating instrument. As shown in FIG. 3, the acceptable line frequency values for a given optical instrument, such as the laparoscope 18, may be provided in a graphical form wherein acceptable line frequency values lay between an upper limit curve 22 and a lower limit curve 24.

If the line frequency values 26 which were determined as described above fall between the upper limit curve 22 and the lower limit curve 24, the laparoscope 18 is operating within acceptable limits and may be used. However, if line frequency values lay outside of the band 28 between the upper limit curve 22 and the lower limit curve 24, the laparoscope 18 is not within acceptable limits and should not be used.

As should be apparent, acceptable line frequency values for the different contrast levels can also be provide directly for example in a table. An appropriate table can be directly constructed or can be derived from the graph of FIG. 3. Derivation from the graph of FIG. 3 is illustrated for a single contrast level $C_1$ for which a line frequency value 26a was determined as described above.

To determine the upper acceptable line frequency value, a horizontal line is extended to the upper limit curve 22 and a vertical line is extended from that point on the curve 22 to the line frequency $f_1$ on the frequency axis. In a similar manner, to determine the lower acceptable line frequency value, a horizontal line is extended to the lower limit curve 22 and a vertical line is extended from that point on the curve 24 to the line frequency $f_2$ on the frequency axis. Upper and lower line frequency values could also be determined for each of the contrast levels corresponding to the blocks 12 of the chart 10 with the resulting values listing in a table which could then be referred to for evaluation of the optical instrument.

Having described the methods and charts of the present invention in detail and by reference to preferred embodiments thereof, it will be apparent that modifications and variations are possible without departing from the scope of the invention defined in the appended claims. For example, the contrast levels of the different levels of the chart 10 may by varied by varying the color intensity of the converging lines 14 and/or the blocks 12.

What is claimed is:

1. A method of evaluating an optical instrument, comprising steps of:
   providing a chart comprising
   a plurality of blocks having like color and varying color intensities,
   a plurality of sets of converging lines, each of said sets of converging lines being located within an associated one of said blocks and having a known contrast level in comparison thereto, said converging lines having substantially the same color as said blocks, and
   a measurement scale for indicating line frequency along said converging lines,
   scanning said sets of converging lines with said optical instrument; and
   using said measurement scale to determine line frequencies along said plurality of sets of converging lines at which a user of said optical instrument is unable to differentiate said converging lines.

2. A method of evaluating an optical instrument as claimed in claim 1, further comprising a step of substantially aligning said plurality of sets of converging lines with one another and with said measurement scale.

3. A method of evaluating an optical instrument as claimed in claim 1, further comprising a step of selecting said plurality of blocks color from a group consisting of red, green, and blue.

4. A method of evaluating an optical instrument as claimed in claim 1, further comprising a step of setting said converging lines to range from 1 line pair per millimeter to 10 line pairs per millimeter.

5. A method of evaluating an optical instrument as claimed in claim 1, further comprising a step of setting said known contrast level between each of said plurality of blocks and said converging lines located therein to range from 100% to 0%.

6. A method of evaluating an optical instrument as claimed in claim 1, further comprising a step of setting said color intensities in gray scale levels.

7. A method of evaluating an optical instrument as claimed in claim 1, further comprising a step of comparing determined line frequencies at which said optical instrument becomes incapable of distinguishing said converging lines to corresponding acceptable line frequencies for a satisfactory optical instrument.

8. A method of evaluating an optical instrument as claimed in claim 7, wherein said step of comparing determined line frequencies to acceptable line frequencies for a satisfactory optical instrument comprises the steps of:
   plotting determined line frequencies at which said optical instrument becomes incapable of distinguishing said converging lines to produce a curve representative of operating characteristics of said optical instrument; and comparing said line frequency plot to a graph containing a range of acceptable line frequencies, to determine whether said optical instrument is performing satisfactorily.

9. A method of evaluating an optical instrument comprising steps of:
viewing a plurality of sets of converging lines positioned on a corresponding plurality of blocks of like color, said plurality of sets of converging lines and said blocks defining a corresponding plurality of different contrast levels therebetween;
scanning said plurality of sets of converging lines through an optical instrument;
determining line frequencies along each of said plurality of sets of converging lines at which a user of said optical instrument is unable to differentiate said converging lines; and
recording said line frequencies.

10. A method of evaluating an optical instrument as claimed in claim 9 further comprising a step of selecting said color to be black.

11. A method of evaluating an optical instrument as claimed in claim 9 further comprising a step of selecting said color from a group consisting of red, green and blue.

12. A chart for evaluating an optical instrument, comprising:
a plurality of blocks having like color and varying color intensities;
a plurality of sets of converging lines, each of said sets of converging lines being located within an associated one of said blocks and having a known contrast level in comparison thereto, said converging lines being of substantially like color as said blocks; and
a measurement scale for indicating line frequency along said plurality of sets of converging lines.

13. A chart for evaluating an optical instrument as claimed in claim 12, wherein said plurality of sets of converging lines and said measurement scale are substantially aligned with one another.

14. A chart for evaluating an optical instrument as claimed in claim 12, wherein said plurality of sets of converging lines range in frequency from 1 line pair per millimeter to 10 line pairs per millimeter.

15. A chart for evaluating an optical instrument as claimed in claim 12, wherein said contrast level between said blocks and said converging lines ranges from 100% to 0%.

16. A chart for evaluating an optical instrument as claimed in claim 12, wherein said color intensities are measured in gray scale levels.

17. A chart for evaluating an optical instrument as claimed in claim 12, wherein said color of said blocks is selected from a group consisting of red, green, and blue.

18. A chart for evaluating an optical instrument, comprising:
a plurality of substantially aligned blocks of like color, color intensities of said blocks ranging from near-white to near-black;
a plurality of substantially aligned sets of converging lines, each of said sets of converging lines being located within an associated one of said blocks and having a known contrast level in comparison therewith, said converging lines having substantially like color and color intensity as at least one of said blocks, and said converging lines ranging in frequency from 1 line pair per millimeter to 10 line pairs per millimeter; and
a measurement scale substantially aligned with said plurality of converging lines, for indicating line frequencies along said converging lines.

19. A chart for evaluating an optical instrument as claimed in claim 18, wherein said color of said plurality of blocks is selected from a group consisting of red, green, and blue.

20. A chart for evaluating an optical instrument as claimed in claim 18, wherein said contrast level between said blocks and said plurality of substantially aligned sets of converging lines ranges from 100% to 0%.

21. A method of testing an optical instrument, comprising steps of:
providing a chart comprising
a sequence of blocks of varying color intensities,
a plurality of sets of converging lines, each of said sets of converging lines being located within an associated one of said blocks and having a known contrast level in comparison therewith, said converging lines being substantially identical in hue, and
a measurement scale for indicating line frequency along said converging lines;
scanning said sets of converging lines with said optical instrument; and
using said measurement scale to determine line frequency along said converging lines at which a user of said optical instrument is unable to differentiate said converging lines.

* * * * *